(12) United States Patent
Ratliff, Jr.

(10) Patent No.: US 7,028,733 B2
(45) Date of Patent: *Apr. 18, 2006

(54) PNEUMATIC TIRE HAVING CIRCUMFERENTIALLY EXTENDING RIB WITH CHAMFERS

(75) Inventor: Billy Joe Ratliff, Jr., Clinton, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 170 days.

This patent is subject to a terminal disclaimer.

(21) Appl. No.: 10/601,936

(22) Filed: Jun. 23, 2003

(65) Prior Publication Data

US 2004/0256040 A1  Dec. 23, 2004

(51) Int. Cl.
  *B60C 11/04* (2006.01)
  *B60C 11/12* (2006.01)

(52) U.S. Cl. .................. 152/209.15; 152/209.18; 152/209.21; 152/900; 152/DIG. 3

(58) Field of Classification Search .......... 152/209.15, 152/209.18, 209.21, 209.28, DIG. 3, 900, 152/901
See application file for complete search history.

(56) References Cited

U.S. PATENT DOCUMENTS

| | | | | |
|---|---|---|---|---|
| 4,057,089 A | 11/1977 | Johannsen | .............. | 152/209 R |
| 4,641,695 A | 2/1987 | Lindner | ................. | 152/209 A |
| 4,667,717 A | 5/1987 | Graas | .................... | 152/209 A |
| 4,726,407 A | 2/1988 | Hayakawa et al. | ...... | 152/209 R |
| 4,926,919 A * | 5/1990 | Hopkins et al. | ........ | 152/DIG. 3 |
| 5,152,854 A | 10/1992 | Matsumoto | ................. | 152/209 |
| D358,793 S | 5/1995 | Himuro et al. | ............ | D12/151 |
| 5,421,391 A | 6/1995 | Himuro | ..................... | 152/209 |
| D366,020 S | 1/1996 | Himuro et al. | ............ | D12/149 |
| 5,609,699 A | 3/1997 | Himuro | ................... | 152/209 R |
| 5,707,461 A | 1/1998 | Himuro | ..................... | 152/209 |
| 5,885,384 A | 3/1999 | Himuro | ................... | 152/209 R |
| 5,967,210 A | 10/1999 | Himuro | ................... | 152/209 A |
| D416,836 S | 11/1999 | Himuro | ..................... | D12/147 |
| 6,123,129 A | 9/2000 | Himuro | ..................... | 152/209 |
| D432,057 S | 10/2000 | Himuro | ..................... | D12/146 |
| 6,213,180 B1 | 4/2001 | Himuro | ................... | 152/209.15 |
| 6,250,354 B1 * | 6/2001 | Kawai | ................... | 152/DIG. 3 |
| D445,730 S | 7/2001 | Himuro | ..................... | D12/147 |
| D454,833 S | 3/2002 | Buresh et al. | ............. | D12/567 |
| 6,520,230 B1 | 2/2003 | Ratliff, Jr. | ................... | 152/209 |
| 2001/0017177 A1 | 8/2001 | Himuro | ................... | 152/209.1 |
| 2002/0062892 A1 | 5/2002 | Himuro | ................. | 152/209.18 |
| 2003/0019555 A1 * | 1/2003 | Nakagawa | ............. | 152/DIG. 3 |
| 2004/0069389 A1 * | 4/2004 | Ratliff, Jr. | ............. | 152/209.15 |
| 2004/0238092 A1 * | 12/2004 | Colombo et al. | ...... | 152/209.15 |
| 2004/0256039 A1 * | 12/2004 | Ratliff et al. | .......... | 152/209.18 |
| 2004/0256041 A1 * | 12/2004 | Ratliff, Jr. | ............. | 152/209.18 |

FOREIGN PATENT DOCUMENTS

| | | | |
|---|---|---|---|
| EP | 0882606 | | 12/1998 |
| EP | 1075971 | | 2/2001 |
| EP | 1090781 | | 4/2001 |
| EP | 1197355 | | 4/2002 |
| JP | 1-215604 | * | 8/1989 |
| JP | 2-179508 | * | 7/1990 |

(Continued)

*Primary Examiner*—Steven D. Maki
(74) *Attorney, Agent, or Firm*—Nancy T. Krawczyk

(57) ABSTRACT

A tire tread for a pneumatic tire has at least one circumferentially extending rib. The rib has a high siping density to provide flexibility to the rib. To provide support to the rib, circumferentially extending along, and attached to, the side of each rib is supporting chamfer.

16 Claims, 4 Drawing Sheets

FOREIGN PATENT DOCUMENTS

| | | | |
|---|---|---|---|
| JP | 2002-29222 | * | 1/2002 |
| JP | 2002-29225 | * | 1/2002 |
| JP | 2002-103919 | * | 4/2002 |
| JP | 2002-240513 | * | 8/2002 |

* cited by examiner

PNEUMATIC TIRE HAVING CIRCUMFERENTIALLY EXTENDING RIB WITH CHAMFERS

FIELD OF THE INVENTION

The present invention is directed to a tire tread with improved all weather performance. The tread is provided with at least a central rib that is supported along the sides.

BACKGROUND OF THE INVENTION

In a conventional tire for typical use as on a passenger car or light truck, the tire tread is provided with a series of grooves, either circumferentially or laterally extending, or a combination of both, to form a plurality of blocks. Alternatively, the tread may be provided with at least one continuous rib. For truck tires, an all rib tread may be desired to maintain greater road contact.

A rib in the tire tread provides high ground contact and tread stiffness, however, the traction may be reduced due to fewer edges to the continuous tread material. To enhance traction, it is not unknown to provide siping in the tread rib. However, as the siping is increased, the stiffness desired by the presence of the rib may be reduced as a tradeoff for enhanced traction.

The present invention is directed to a rib configured for enhanced traction, while maintaining a high rib stiffness.

SUMMARY OF THE INVENTION

The present invention is directed to a pneumatic tire having a tread wherein the tread stiffness, ground contact, and traction are achieved.

The present invention is directed to a tire wherein good water flow is enhanced while maintaining a desired tread stiffness.

Disclosed is a pneumatic tire comprising a tread and shoulders adjacent the tread, the tread having at least one circumferentially extending rib. The rib has laterally extending edges and circumferentially extending edges, wherein, extending along the circumferentially extending edges, and connected to the rib are chamfers. The ribs are provided with a plurality of sipes, having a sipe density of two to eight sipes per inch (0.78–3.15 sipes per cm).

In one aspect of the invention, the rib is defined by a plurality of laterally extending edges and the circumferentially extending edges. The chamfers extend extends from the laterally oriented edge and decreases in width from the laterally oriented edge to the circumferentially adjacent laterally oriented edge.

The chamfers may be formed in a variety of configurations. In one aspect, the radial height of the chamfer gradually decreases from the laterally oriented edge to the adjacent laterally oriented edge. In another aspect, the axially outermost edge of the chamfer, relative to the equatorial plane of the tire, gradually increases in height while the axially innermost edge of the chamfer gradually decreases in height.

In one aspect of the tire, the tread is comprised of at least two adjacent chamfered ribs and the laterally extending edges of the adjacent ribs are aligned to form a straight line. In another aspect of the tread, the laterally extending edges and/or the circumferentially extending edges of the rib are inclined in the same direction, parallel to one another.

In another aspect of the tire, the tread has at least two adjacent chamfered ribs and the chamfers in the adjacent ribs are circumferentially overlapping by a length of 5 to 75% of the greatest circumferential length of the chamfers.

In another aspect of the tire, the laterally extending edges of the ribs are inclined at an angle in the range of 45°–90° relative to the equatorial plane of the tire.

BRIEF DESCRIPTION OF THE DRAWINGS

The invention will be described by way of example and with reference to the accompanying drawings in which.

DETAILED DESCRIPTION OF THE INVENTION

Figure 1:
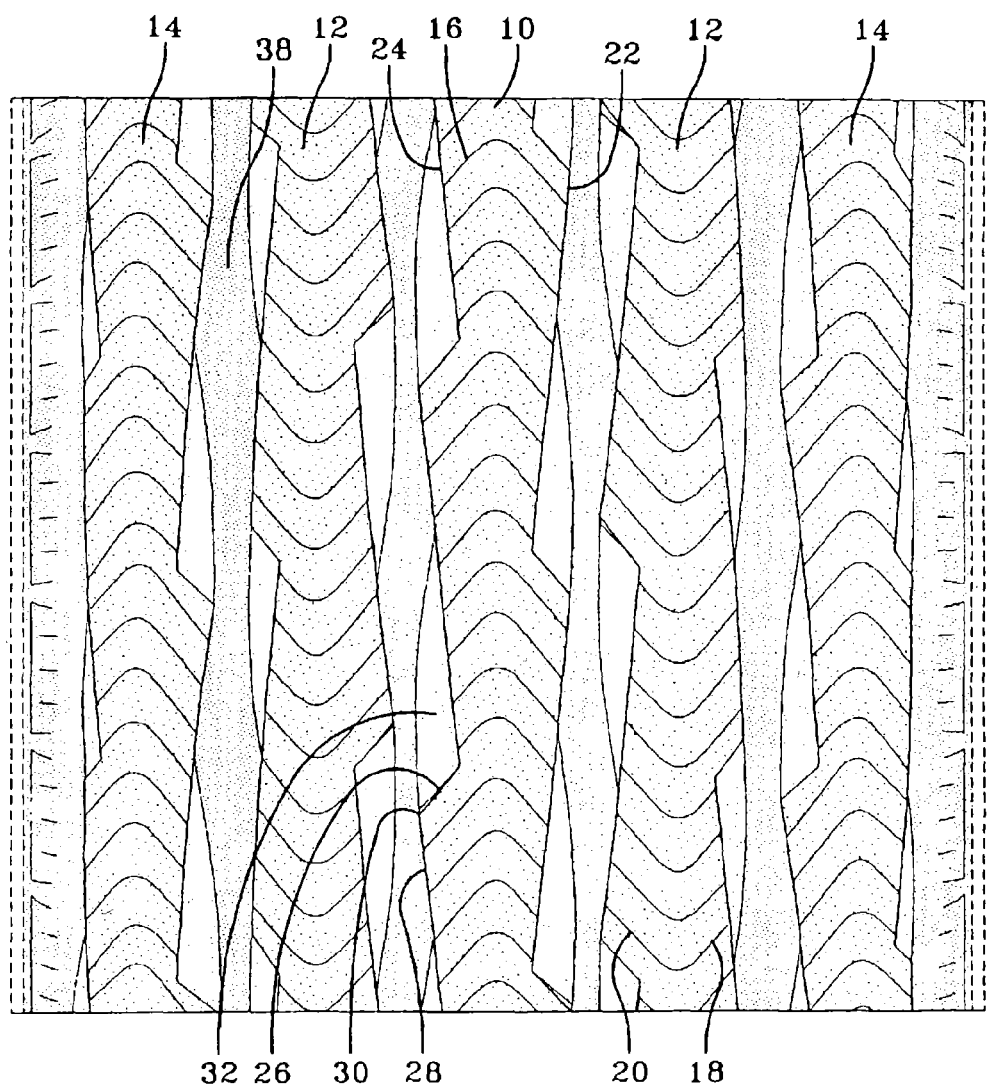
FIG. 1 is a plan view of the tire.

The following language is of the best presently contemplated mode or modes of carrying out the invention. This description is made for the purpose of illustrating the general principals of the invention and should not be taken in a limiting sense. The scope of the invention is best determined by reference to the appended claims.

When operating in winter driving conditions, the central region of the tire has the most impact on the performance of the tire. In the present tire tread, the center of the tread is provided with a continuously extending rib 10, see FIG. 1. Located on each side of the center rib 10 is at least one additional rib. In the illustrated tread, there are two ribs 12, 14 located on each side of the central rib 10. The ribs 12 adjacent to the center rib 10 are inverse images of the center rib 10. Each rib 14 located outward of the mid-region rib 12 is identical to the center rib 10 and inverse images of the mid-region ribs 12.

At a minimum, the center rib 10 has sipes 16 extending across the full lateral width of the rib 10. The rib 10 has a heavy sipe density, within the range of 2 to 8 sipes per inch (0.78–3.15 sipes/cm), with a preferred density of 3 to 7 sipes per inch (1.18 to 2.76 sipes/cm). The presence of the rib 10 provides good ground contact for the tread center, while the heavy siping of the rib 10 provides for increased traction as the multiple sipes 16 flex open providing tread edges when the tread contacts the ground.

The sipes 16 have a non-linear configuration of at least two inclined portions. The sipes 16 in FIG. 1 are formed of two inclined portions 18, 20. The inclined portions 18, 20 are placed at substantially similar, but oppositely inclined angles to form an inverse V configuration, wherein the apex of the V is located at approximately the equatorial plane EP of the tire. The spacing between circumferentially adjacent sipes 16 is constant, but may be varied to permit pitching of the tire for optimization of the noise characteristics of the tire.

The sides 22, 24 of at least the center rib 10, when viewed from above, has an extended, serrated configuration at the surface of the rib 10 that contacts the ground when the tread is new and not worn. Each serration is formed from a laterally oriented edge 26 and an inclined circumferentially extending edge 28; the junction of the two edges 26, 28 forming a serration point 30. The serration points 30 on each side of the rib 10 are laterally offset from each other.

Extending from the laterally oriented edge 26 along each side of the rib 10 is a chamfer 32. The chamfer 32 extends in a circumferential direction from the laterally oriented edge 26 of the serration to the next circumferentially adjacent serration point 30, along the side of the rib 10. The axially inner edge 38 of the chamfer 32 is coincident with the side 22, 24 of the rib 10.

Due to the chamfer 32, at the tread depth the rib 10 has an almost straight configuration. The chamfers 32 have a greatest width where the chamfer 32 initiates at the laterally oriented edge 26 of the serration. The width of the chamfer 32 narrows as the axially outermost edge 32 of the chamfer 32 is substantially parallel to the equatorial plane EP of the tire while the lateral edges 22, 24 of the rib 10 are inclined in the circumferential direction. The provision of the chamfers 32 behind the heavily siped rib 10 provides support for the rib 10 as the sipes 16 flex open, strengthening the rib 10 and maintaining good ground contact pressure.

Figure 2:
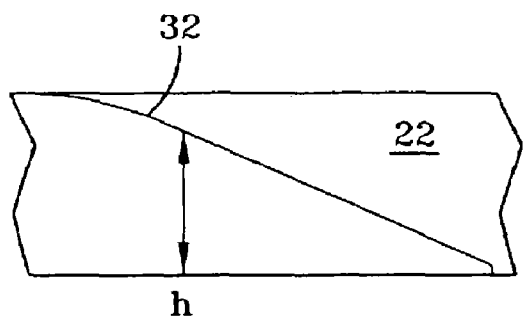
FIGS. 2–5 are various embodiments of the rib chamfers.

FIG. 2 illustrates a side view of the chamfer 32. The chamfer 32 has a maximum width at the laterally oriented edge 26 of the serration, and gradually decreases in width as the chamfer 32 approaches the next adjacent serration point 30. The height h of the chamfer 32 gradually decreases, relative to the full tread depth, in the circumferential direction. As chamfer 32 extends along the circumferential extending edge 28 and the height h of the chamfer 32 decreases, the rib side 22 (or 24) is gradually exposed.

Figure 3:
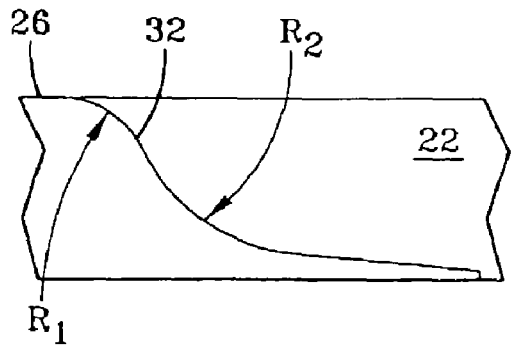

FIG. 3 illustrates a variation of the chamfer 32. The upper surface of the chamfer 32 is multi-planar. Where the chamfer 32 connects with the laterally oriented edge 26, the surface is defined by a radius of curvature R1 located inward of the upper surface of the chamfer 32. Towards the base of the chamfer 32, the top surface is defined by a radius of curvature R2 located outward of the upper surface of the chamfer 32.

Figure 4:
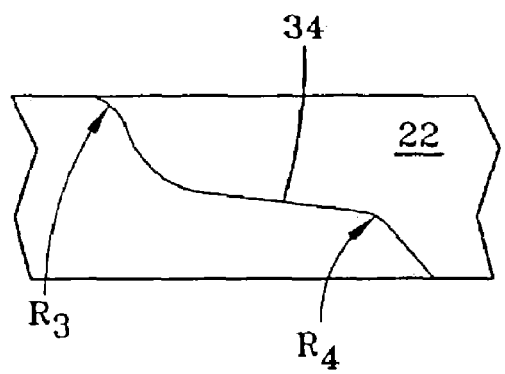

The chamfer 32 of FIG. 4 is a variation of that of FIG. 3 wherein a flat ledge 34 is employed along the mid-length of the chamfer 32. The chamfer 32 forms a tangency R3, R4 to a circle at several locations.

Figure 5:
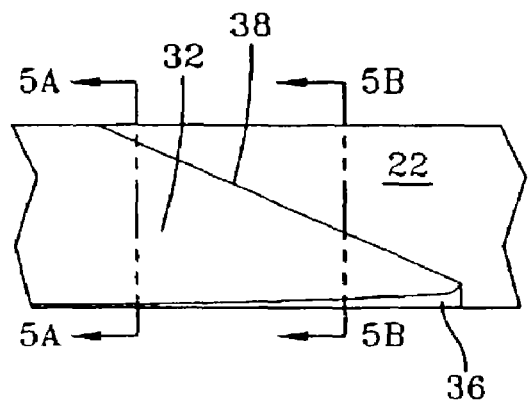
Figure 5A:
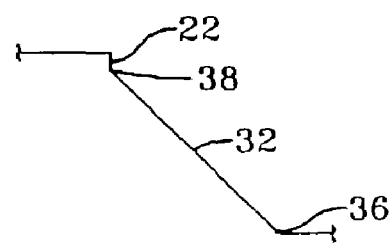
FIGS. 5a–5b are cross sectional views taken of the chamfer of FIG. 5.
Figure 5B:
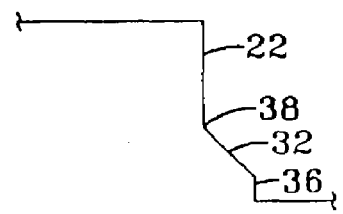

In another embodiment of the chamfer 32, FIG. 5, the top surface of the chamfer 32 has a different multi-planar configuration. At the maximum lateral width, the top surface of the chamfer 32 slopes downward toward the tread edge, see FIG. 5a. As the chamfer width decreases, the axially outer edge 36 of the chamfer 32, relative to the equatorial plane EP of the tire, gradually increases in height relative to the full tread depth. Concurrently, the axially inner edge 38 of the chamfer 32 decreases in height, see FIG. 5b. Thus, as the width of the chamfer 32 decreases, the height, relative to the full tread depth, increases, causing the upper surface of the chamfer 32 to twist.

Figure 6:
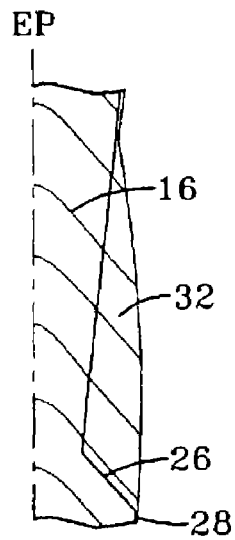
FIG. 6 is a portion of the rib and a chamfer illustrating another embodiment of the siping.

If maintaining tread flexibility as the tread is worn is desired, the sipes 16 in any of the ribs 10, 12, 14 may extend into any side supporting chamfers 32 present in the rib 10, 12, 14, see FIG. 6. When the tread is unworn, the sipes 16 in the chamfers 32 do not open during rotation as there is no contact with the road surface, and the chamfer 32 provides support to the rib 10, 12, 14. After tread wear beings, the uppermost surface of the chamfer 32 slowly becomes part of the ground contacting surface of the tread, the effective rib width increases, and the sipes 16 in the chamfer 32 begins to interact with the remaining tread. In effect, the sipes 16 in the chamfer 32 act as increased grooving of the tread as the tread depth decreases due to tread wear.

The laterally oriented edge 26 of each serration is inclined at an angle of equal or less than 90°, but no less than 45° relative to the equatorial plane EP. In the tread of FIG. 1, the laterally oriented edge 26 of each serration is inclined at approximately 45° relative to the equatorial plane EP. The laterally oriented edges 26 of each serration on each side 22, 24 of each rib 10, 12, or 14 are inclined as offset mirror images of the each other. Because the chamfers 32 extend from the laterally oriented edges 26, the chamfers 32 on each side 22, 24 of each rib 10, 12, or 14 extend in the same direction.

The ribs 12 adjacent to the center rib 10 are inverse images of the center rib 10 with the chamfers 32 of the center rib 10 and the mid-region ribs 12 overlapping and extending in opposing directions. The overlap of a pair of adjacent chamfers is equal to 5 to 75% of the greatest circumferential length of the chamfers 32. The amount of overlap is dictated by the length of the chamfer, and one chamfer 32 may overlap multiple adjacent chamfers 32. The overlapping chamfers effectively act to create a wide circumferential groove 38 at the tread surface, while providing support to the rib.

Thus, good water channeling is achieved, usually a benefit of greater grooving, with good tread stiffness and strength due to the presence of the chamfer. These properties are typically a trade-off for treads, as greater grooving results in a lower net-to-gross contact value and a lower net-to-gross contact value results in a less stiff tread.

Figure 8:
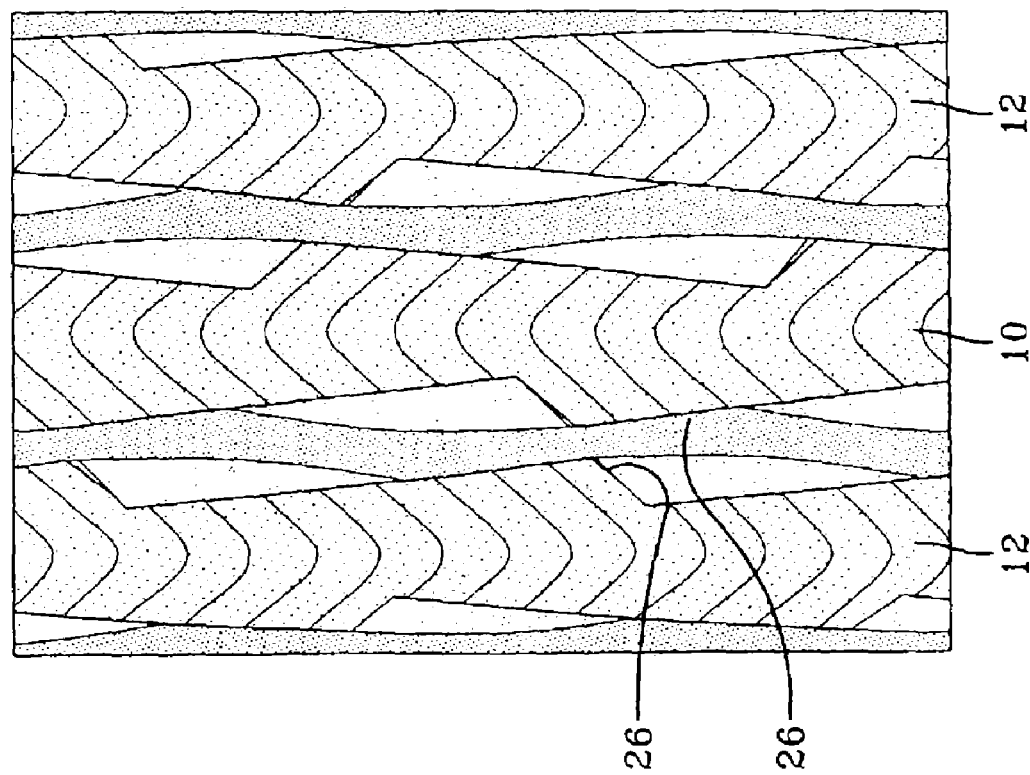

Alternatively, the laterally oriented edges 26 of adjacent ribs 10, 12 or 12, 14 may be aligned along a straight line, see FIG. 8. Each laterally oriented edge 26 along one side 22 or 24 of the rib is aligned with the laterally oriented edge 26 on the near side 22 or 24 of the adjacent rib. Thus the beginnings of the chamfers 32 are aligned.

The alignment and overlapping of adjacent chamfers 32 and laterally oriented edges 26 may be repeated for the adjacent ribs 12, 14 across the tread width. For the tread of FIG. 1, each rib 10, 12, 14 of the tread is directional, but the combination of the ribs 10, 12, 14 yields a non-directional tread configuration.

Figure 7:
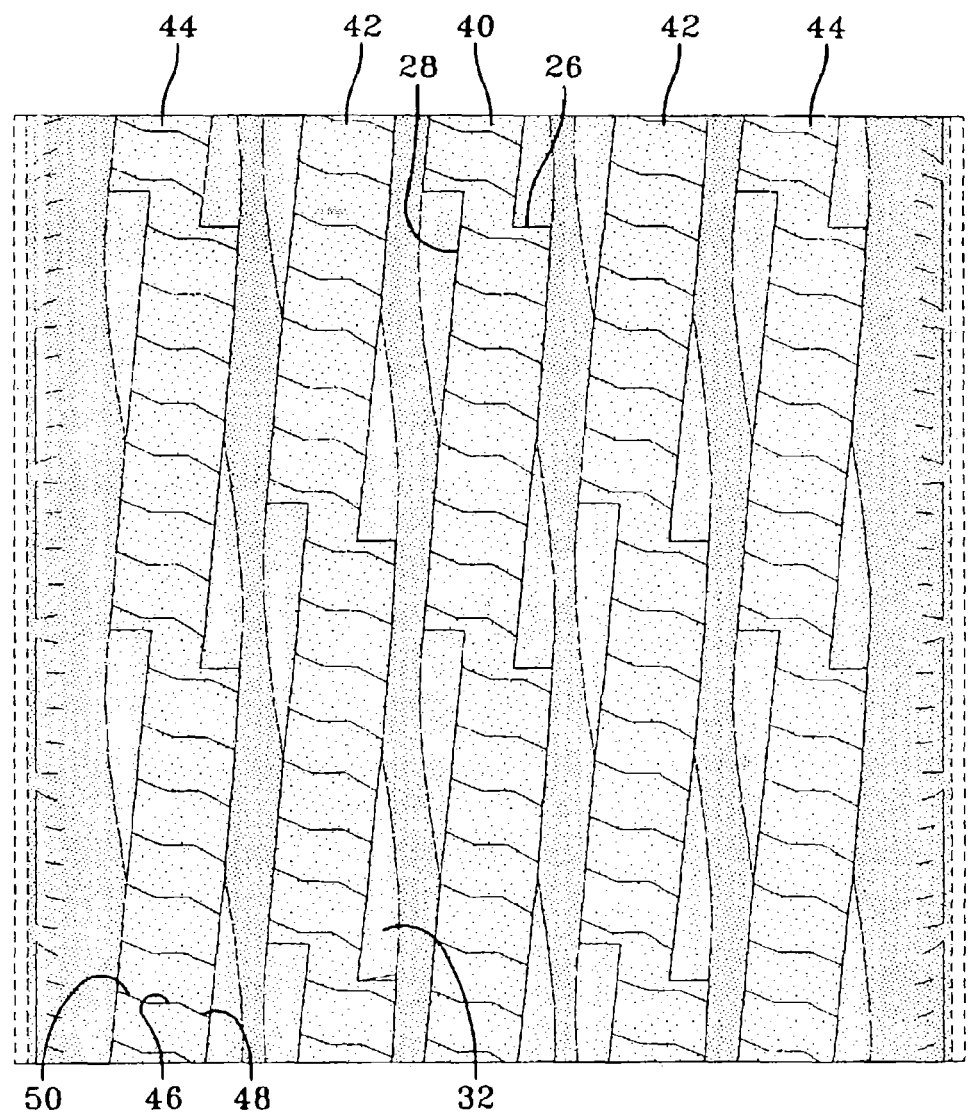
FIG. 7 is another alternative of the tread.
Figure 9:
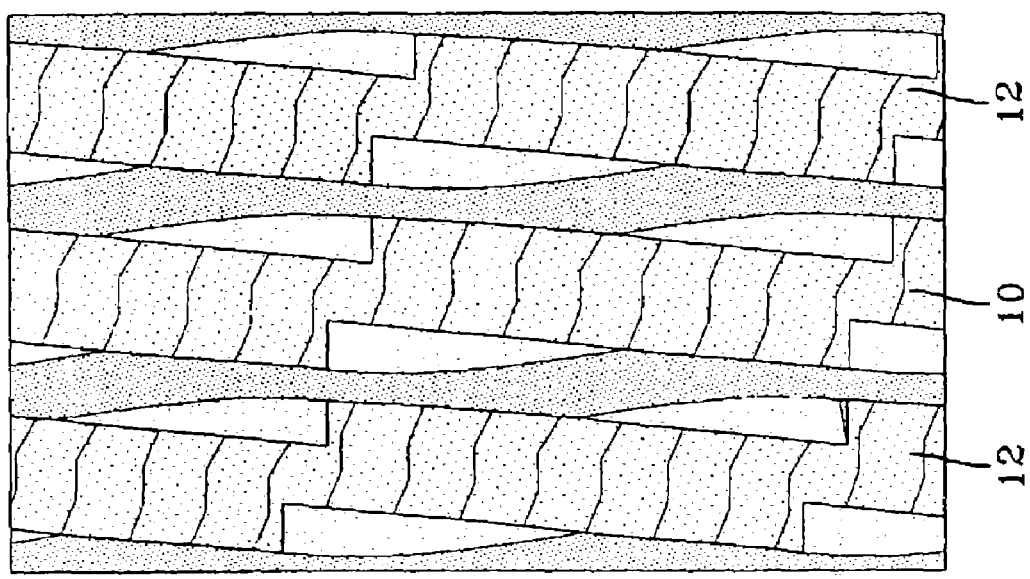
FIGS. 8 and 9 are variations of the treads.

FIG. 7 illustrates another tread using the same principals of rib construction. In the tread, the laterally oriented edges 26 of at least one rib 40, 42, 44 are inclined in the same direction. To maintain the serrated configuration, the circumferentially extending edges 28 of the serration are inclined in the same direction, parallel to each other. Each resulting rib 40, 42, 44 is non-directional and are combined to form a ribbed non-directional tire.

The laterally oriented edges 26 are inclined at an angle of equal or less than 90°. For the illustrated tire, the edges 26 are at an angle of about 90° relative to the equatorial plane. The chamfers 32 on each side of the rib 40, 42, 44 are inclined in opposing directions.

The sipes 46 are formed of multiple portions, wherein the first 48 and third 50 portions of the sipe 46 are inclined at substantially equal inclination angles. The sipe configuration is selected to correspond with the overall rib configuration, and to maintain or reinforce the directional or non-directional nature of the individual ribs 10, 12, 14.

The inclination angle of the circumferentially extending edge 28 will also affect the tread configuration. The circumferentially extending edge 28 is inclined at angle of approximately 0° to 30° relative to the equatorial plane EP of the tire. When the circumferentially extending edges are substantially parallel to the EP, then the circumferentially adjacent laterally oriented edges 26 are inclined in opposing directions; or else the rib will "walk" across the tread.

The width of the laterally oriented edges 26 can dictate the width and length of the chamfer 32. The wider the edge 26, the wider and/or longer the chamfer may be.

In another variation of the present invention, serrated, chamfered edged ribs may be located on the sides of the equatorial plane EP, forming a circumferentially extending groove at the equatorial plane EP.

The disclosed rib configuration may also be used in connection with lateral grooves.

The primary importance of the present invention is the combination of a heavily siped rib with a chamfer extending along the side of the rib to provide support to the heavily siped rib. By this configuration, the conflicting goals of good traction and stiffness are achieved by means of the tread configuration without resorting to other tire constructions or materials of construction to achieve the desired goals.

Other features of the non-direction tread may be identical to that of the directional tread, with permissible variations in accordance with those already discussed.

What is claimed is:

1. A pneumatic tire comprising a tread and shoulders adjacent the tread, the tread comprising at least one circumferentially extending rib, the rib having opposed sides, laterally extending edges and circumferentially extending edges, the laterally extending edges and circumferentially extending edges contacting the ground when the tread is new and not worn wherein, circumferentially extending from the laterally extending edges and extending along the circumferentially extending edges, and connected to the rib are chamfers, the outer edge of each chamfer is convexly curved relative to the centerline of the rib the chamfers on opposed sides of the rib being circumferentially overlapping, and wherein, as the chamfers extend along the circumferentially extending edges, the rib side is gradually exposed, and the rib having a plurality of sipes with a density of two to eight sipes per inch (0.78–3.15 sipes per cm).

2. The tire of claim 1 wherein each chamfer decreases in width from the laterally oriented edge to the circumferentially adjacent laterally oriented edge.

3. The tire of claim 1 wherein the radial height of the chamfer decreases from the laterally oriented edge to the circumferentially adjacent laterally oriented edge.

4. The tire of claim 1 wherein the axially outermost edge of the chamfer, relative to the equatorial plane of the tire, gradually increases in height while the axially innermost edge of the chamfer gradually decreases in height.

5. The tire of claim 2 wherein the laterally oriented edges on each side of the rib are circumferentially offset from the laterally oriented edges on the opposing side of the rib.

6. The tire of claim 1 wherein the sipes are comprised of at least two inclined portions.

7. The tire of claim 1 wherein the rib is located on the equatorial plane of the tire.

8. The tire of claim 1 wherein the tread is comprised of at least three of the chamfered ribs.

9. The tire of claim 1 wherein at least one of the chamfered ribs are located on each side of the equatorial plane of the tire.

10. The tire of claim 1 wherein the tread is comprised of at least two adjacent chamfered ribs and the laterally extending edges of the adjacent ribs are aligned to form a straight line.

11. The tire of claim 1 wherein the tread is comprised of at least two adjacent chamfered ribs and the chamfers in the adjacent ribs are circumferentially overlapping by length of 5 to 75% of the greatest circumferential length of the chamfers.

12. The tire of claim 1 wherein the laterally extending edges are inclined at an angle in the range of 45°–90° relative to the equatorial plane of the tire.

13. The tire of claim 1 wherein the circumferentially extending edges of the rib are inclined in the same direction, parallel to one another.

14. The tire of claim 1 wherein the circumferentially extending edges of the rib are inclined at the same angle relative to the equatorial plane but in opposing directions.

15. The tire of claim 1 wherein the circumferentially extending edges of the rib are inclined at an angle greater than 0° but not more than 30° relative to an equatorial plane of the tire.

16. A pneumatic tire comprising a tread and shoulders adjacent the tread, the tread comprising at least one circumferentially extending rib, the rib having opposed sides, laterally extending edges and circumferentially extending edges, the laterally extending edges and circumferentially extending edges contacting the ground when the tread is new and not worn wherein, circumferentially extending from the laterally extending edges and extending along the circumferentially extending edges, and connected to the rib are chamfers, the outer edge of each chamfer is convexly curved relative to the centerline of the rib the chamfers on opposed sides of the rib being circumferentially overlapping, and wherein, as the chamfers extend along the circumferentially extending edges, the rib side is gradually exposed, and the rib having a plurality of sipes with a density of two to eight sipes per inch (0.78–3.15 sipes per cm) wherein the sipes extend laterally into the chamfers.

* * * * *